Jan. 4, 1927. 1,613,049

A. MONTOUR

INCUBATOR

Filed August 15, 1925

INVENTOR
Athanase Montour

Patented Jan. 4, 1927.

1,613,049

UNITED STATES PATENT OFFICE.

ATHANASE MONTOUR, OF LA TRAPPE, QUEBEC, CANADA.

INCUBATOR.

Application filed August 15, 1925, Serial No. 50,499, and in Canada October 16, 1924.

My invention relates to improvements in incubators, especially in incubators provided with a plurality of egg containers mounted in trays.

The object of my invention is to provide an improved mechanism by which the egg containers may be rocked so as to change the position of the eggs at various times during the incubation.

A further object is to effect a rocking movement most favorable for successful incubation,—

First, without opening the incubator, thus avoiding changes in temperature inside thereof;

Second, turning the eggs with rapidity;

Third, to maintain the eggs the larger ends upmost;

Fourth, to decrease the space required for the trays and to maintain them in horizontal position.

I attain these objects by means of the mechanism illustrated in the accompanying drawings, in which—

Figure 1:
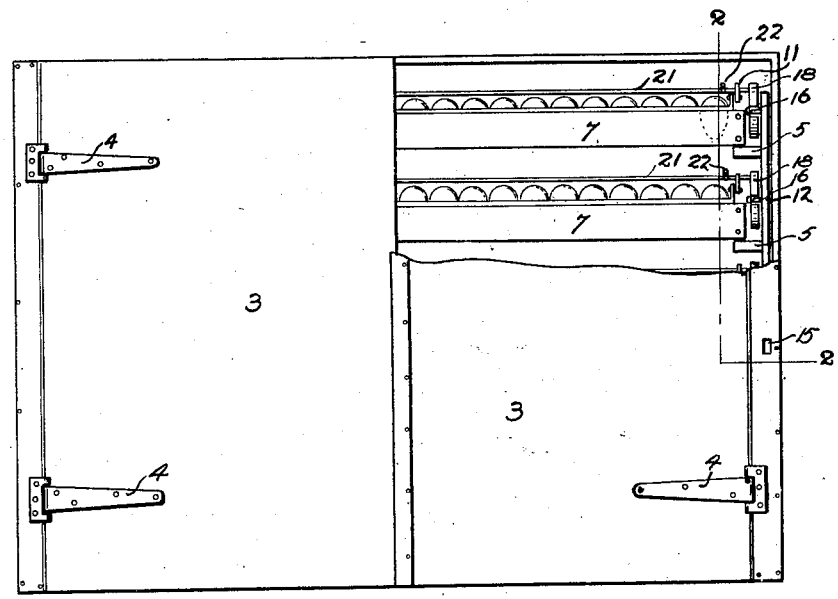
Figure 1 is a front view of an incubator with one of the doors broken away to show the position of the egg trays.

In Figure 1 is shown a schematic view of an incubator casing provided with doors 3 suitably hinged such as at 4 and preferably arranged to close centrally. The interior of said incubator is provided with tray supports 5, in this case comprising cleats mounted on upright bars 6 and positioned at sufficient intervals to allow the movement of the egg trays without interference.

Figure 2:
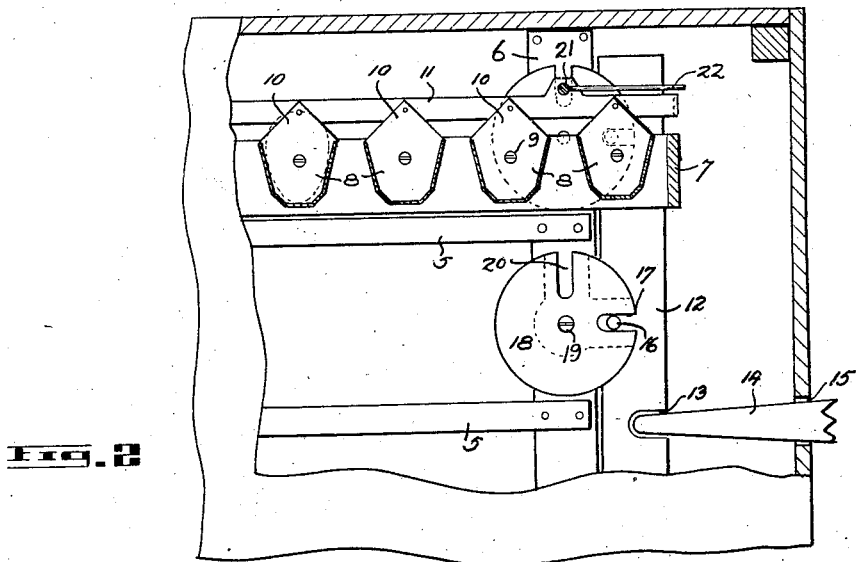
Figure 2 is a section of an incubator on line 2—2 Figure 1, showing the mode of actuating the egg trays.

The egg trays, as illustrated in Figure 2, comprise a frame 7 in which are pivotally mounted egg holders 8. These holders are pivoted to the side of the trays by means of screws 9. In the present instance, the trays are shaped trough-like and have a triangular extension 10 at each end projecting over the frame 7. In order to rock the egg holders, each triangular extension 10 is perforated at the apex of the angle to receive a screw or rivet which extends into a bar 11 positioned across the ends of the egg holders so that when the bar is moved, the whole of the trays connected thereto will rock simultaneously. It will be understood that the incubator may contain a plurality of superposed egg trays mounted as previously described.

In order to operate the whole of the egg trays in one operation from outside the incubator, I have provided the following arrangement: A bar 12 is mounted to move vertically at the front end of the incubator. Bar 12 is provided with a notch 13 to allow the entrance of a lever 14 which extends from outside the incubator through a slot 15, the slot acting as a fulcrum for the lever. Bar 12 is provided with pins 16 to engage a notch 17 in a disk 18, which disk is mounted to rotate on the bar 6 by means of a pivot 19. The disk 18 has a second slot 20 intended to engage the end of a rod 21 which rod runs across the egg tray and is slidingly mounted in bar 11 so that when the same is pushed outwardly by means of the rod 22, it will engage into the slot 20 of the disk. Thus engaged, it will be evident that if the disk is rotated, the bar 11 will be moved accordingly. This will have the effect of tilting the egg holders in the desired position.

In operation, the eggs having been placed in their holders 10, the trays are slid in the incubator over their supports 5. The bar 21 is moved so that its end will extend into the notch 20 of the disc and as the disc is also in engagement with pin 16 mounted on the movable upright bar 12, the movement of said bar 12 by means of lever 14 will cause the bar 11 to be moved according to the rotation of disc 18 and as all the egg trays are inter-connected to be moved simultaneously, the actuating of lever 14 will perform this simultaneous movement, hence quick change in the position of the eggs in the incubator will be obtained. It will, therefore, be evident that a number of trays may be acted upon simultaneously and that the advantage of such mechanism for turning the eggs with rapidity is evident without opening the incubator, hence the maintenance of an even temperature will be obtained. Should it be desired to remove one of the trays from the incubator, all that is necessary is to remove pin 21 by means of rod 22 by sliding the same out of slot 20 thus disengaging the pin from disc 18 and freeing the drawer from any obstruction to prevent its withdrawing. The mechanism described and illustrated is one preferred form of the invention but many changes may be made without departing from the spirit of the invention as hereinafter claimed.

What I claim is:

1. In an incubator, in combination with a plurality of superposed trays having a plurality of egg containers rotatably mounted therein, means to simultaneously rock the egg containers, comprising a lever fulcrumed in the wall of the incubator, a vertical bar engaged by said lever, disks engaged by said bar, a number of horizontal bars corresponding to the number of superposed trays mounted adjacent said trays, means to engage said horizontal bars with each respective disk, said horizontal bars being pivotally connected to the egg containers in the egg trays.

2. In an incubator of the class described, an egg tray, a plurality of egg containers rotatably mounted in said tray, a bar pivotally connected to each egg container, means to reciprocate said bar, comprising a pin slidably mounted in said bar, a disk having a notch into which said pin engages, means to slide said pin so as to connect or disconnect the same to said disk, and means accessible to an operator outside of the incubator to rotate said disk.

3. In an incubator of the class described, an incubator casing, an opening in said casing to receive an operating lever, a bar mounted vertically inside of said incubator having a notch to receive the end of said lever, a pin carried by said bar, a disk rotatably mounted on the wall of said incubator, said disk having a notch into which said pin engages, an egg tray, a plurality of egg containers pivotally mounted in said tray, a bar to which said egg containers are pivotally connected, a pin mounted in said bar positioned to engage a second notch in said disk so that when the disk is rotated by the said lever the said bar connecting the egg containers will move to and fro and thereby rock the said egg containers.

4. In an incubator of the class described, a plurality of egg trays, means to superpose the same in said incubator, means to slidingly support the same horizontally, egg containers mounted in said trays, means to rotatingly support said egg containers comprising pins engaging the side wall of said tray, a horizontal bar to transmit a rotating movement to the egg containers, said bars being pivotally connected to each egg container, a pin slidingly mounted at one end of each horizontal bar, a vertical bar slidingly mounted on the wall of said incubator, said bar being provided with a notch, a lever passing through said incubator positioned to engage said notch in said vertical bar, pins secured to said vertical bar, disks rotatably mounted on the inside wall of said incubator, notches in said disks to receive the pins on the vertical bar and the horizontal bar so that when the vertical bar is moved a corresponding opposite movement will be imparted to the horizontal bar, thereby rocking the egg containers so as to change the position of the eggs.

In testimony of the foregoing, I have hereunto affixed my signature, this 19th day of Feb. 1925, at Montreal.

REV. ATHANASE MONTOUR.